Nov. 19, 1957 F. J. KURTH ET AL 2,813,474

HIGH VELOCITY AIR DISTRIBUTION APPARATUS

Filed Aug. 4, 1953 6 Sheets-Sheet 1

INVENTORS

Franz J. Kurth, Friedrich Honerkamp, Leonard R. Phillips, William J. Waeldner, and Carl Olen Wood BY Albert J. Kramer

ATTORNEY

HIGH VELOCITY AIR DISTRIBUTION APPARATUS
Filed Aug. 4, 1953 6 Sheets-Sheet 2
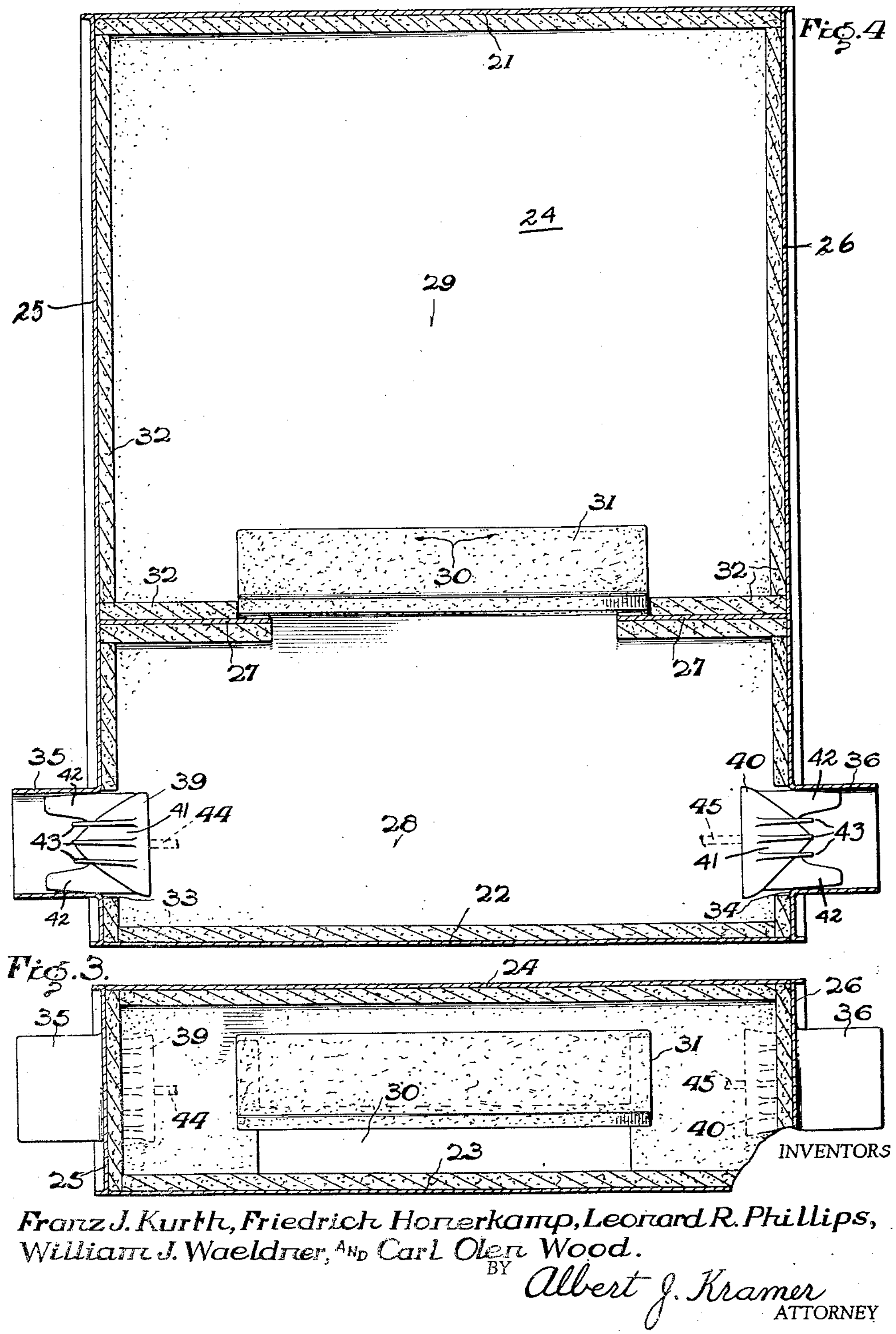
INVENTORS
Franz J. Kurth, Friedrich Honerkamp, Leonard R. Phillips, William J. Waeldner, AND Carl Olen Wood.
BY Albert J. Kramer
ATTORNEY Nov. 19, 1957 F. J. KURTH ET AL 2,813,474
HIGH VELOCITY AIR DISTRIBUTION APPARATUS
Filed Aug. 4, 1953 6 Sheets-Sheet 3
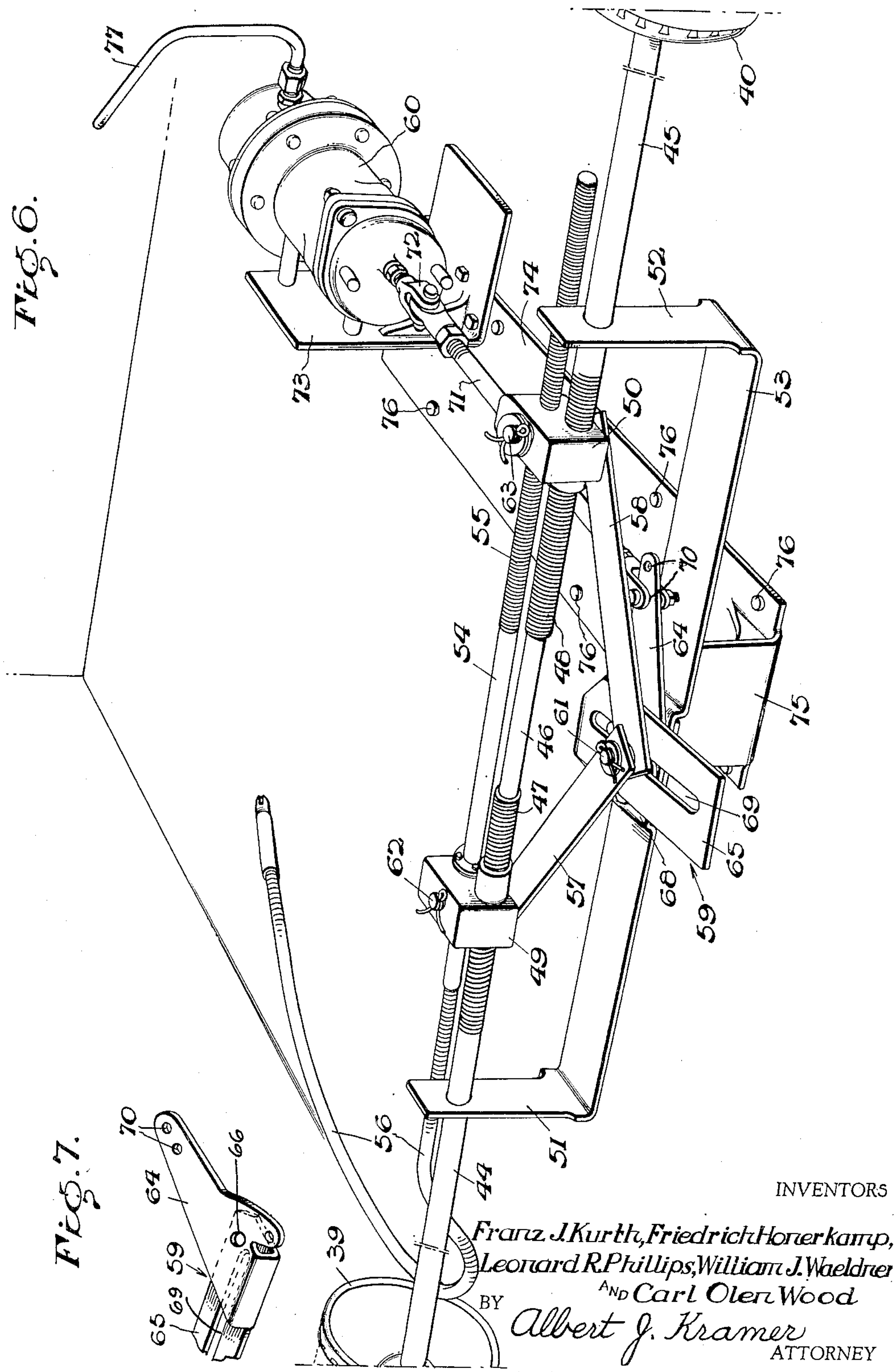
INVENTORS
Franz J. Kurth, Friedrich Honerkamp, Leonard R. Phillips, William J. Waeldner AND Carl Olen Wood
BY Albert J. Kramer
ATTORNEY

HIGH VELOCITY AIR DISTRIBUTION APPARATUS

Filed Aug. 4, 1953 6 Sheets-Sheet 4

INVENTORS

Franz J. Kurth, Friedrich Honerkamp, Leonard R. Phillips, William J. Waeldner AND Carl Olen Wood.

BY Albert J. Kramer

ATTORNEY

Nov. 19, 1957 F. J. KURTH ET AL 2,813,474
HIGH VELOCITY AIR DISTRIBUTION APPARATUS
Filed Aug. 4, 1953 6 Sheets-Sheet 5
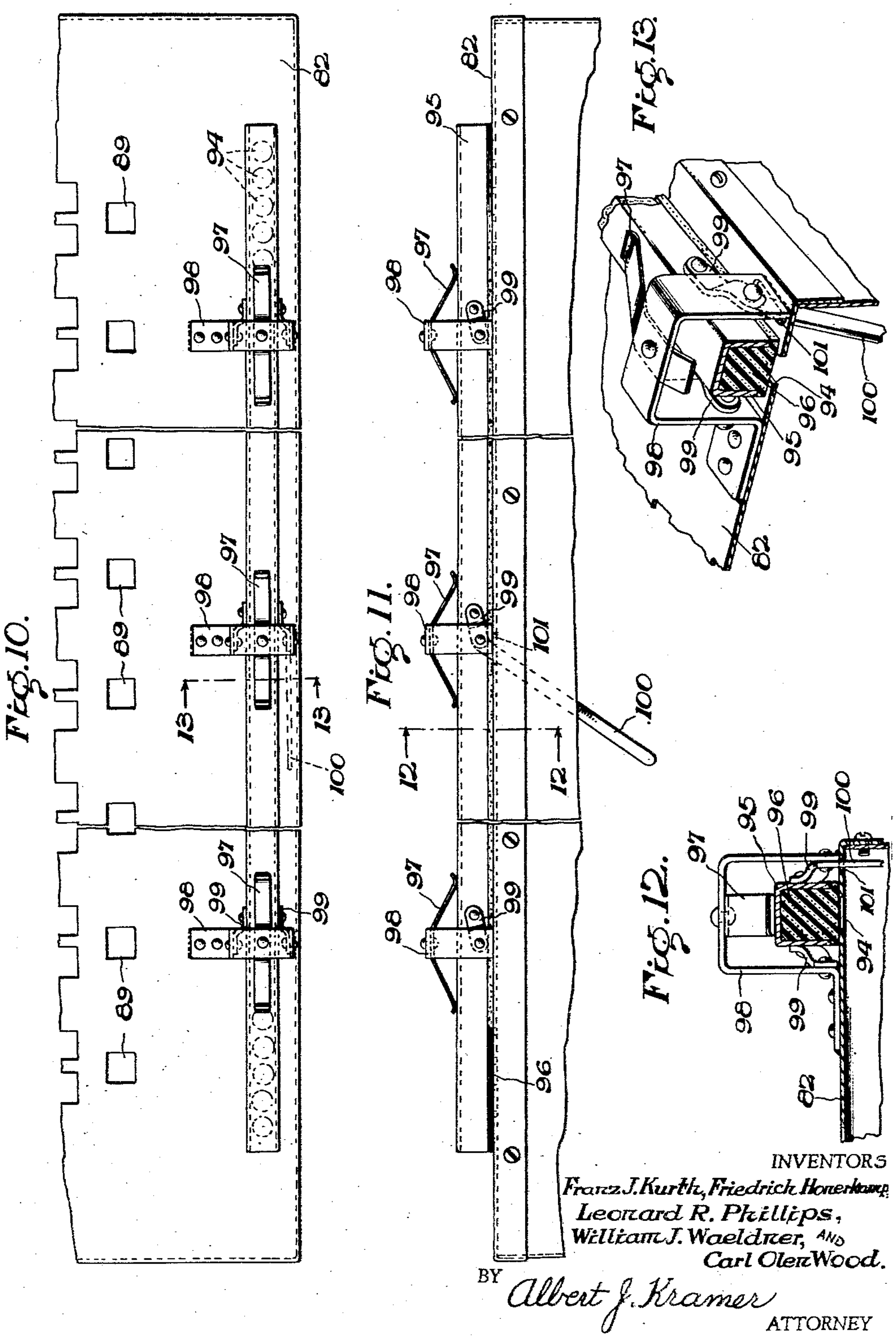
INVENTORS
Franz J. Kurth, Friedrich Honerkamp,
Leonard R. Phillips,
William J. Waeldner, AND
Carl Olen Wood.
BY Albert J. Kramer
ATTORNEY Nov. 19, 1957 F. J. KURTH ET AL 2,813,474

HIGH VELOCITY AIR DISTRIBUTION APPARATUS

Filed Aug. 4, 1953 6 Sheets-Sheet 6

INVENTORS

Franz J. Kurth, Friedrich Honerkamp,
Leonard R. Phillips, William J. Waeldner,
AND Carl Olen Wood.

BY Albert J. Kramer ATTORNEY

United States Patent Office 2,813,474

Patented Nov. 19, 1957

1

2,813,474

HIGH VELOCITY AIR DISTRIBUTION APPARATUS

Franz J. Kurth, Mamaroneck, N. Y., and Friedrich Honerkamp, West Hartford, Leonard R. Phillips, East Hartford, William J. Waeldner, Farmington, and Carl Olen Wood, West Hartford, Conn., assignors to Anemostat Corporation of America, New York, N. Y., a corporation of Delaware Application August 4, 1953, Serial No. 372,294

11 Claims. (Cl. 98—38)

This invention relates to air distribution apparatus and is more particularly concerned with apparatus for use in connection with high pressure or high velocity systems.

Space limitations frequently make the installation of ordinary air distribution and conditioning systems of adequate capacity in old buildings impractical. In new buildings, too much useful space must often be allocated to an air conditioning installation, principally to the ducts thereof, to provide a system of sufficient capacity.

This space problem has, to a large extent, been reduced by so-called high velocity or high pressure systems whereby the air is fed under high pressure through ducts of relatively small size.

The use of such high velocity systems, while solving the space problem to a large extent, has introduced other problems which have not been fully overcome heretofore. One of these problems is the fact that the high velocity air emerging into a room tends to create drafts that are harmful to occupants of the room and also very objectionable noise which is distracting to persons who may be working, sleeping, or otherwise engaged.

Accordingly, one of the general objects of this invention is the provision of apparatus for discharging the air of a high velocity air distribution system which reduces the noise to a low level and which also rapidly diffuses the air entering a zone or room from the ducts without creating harmful or objectionable drafts.

Another object of the invention is the provision of pressure reducing and discharge apparatus of low noise level, high diffusion capacity, and separate inlet means for the apparatus to receive cold and warm air, said means being equipped with air proportioning valves to regulate the relative amount of cold and warm air admitted to the apparatus before discharge into the zone or room.

A further object of the invention is the provision of apparatus of the type mentioned having specially designed air proportioning valves to reduce the pressure and velocity of air from the air ducts at a low noise level.

A still further object of the invention is the provision of such apparatus in which the proportioning valves are diametrically disposed, means being provided to adjust the valves relative to each other and to move the valves in unison when they are set in any desired position of relative adjustment.

A still further object of the invention is the provision of a linkage system for operating the proportioning valves.

Such high velocity systems use a minimum of primary or supply air, requiring a high temperature differential between such primary air and the enclosure air, that is, the air in the space to be treated. Consequently, a still further object of the invention is the provision of means in connection with such apparatus which will effect mixture of a relatively large quantity of enclosure air with the primary air prior to discharge into the enclosure in order to sharply reduce the temperature differential and produce a large mass movement of air in the enclosure as compared to the amount of primary air fed into the enclosure.

2

A still further object of the invention is the provision in an apparatus for an air distribution system of an air outlet device having a first portion thereof for the passage of primary air from the apparatus and means for selectively directing supply air currents through a second portion of the outlet device or withholding such currents from passing through such second portion.

A still further object of the invention is the provision of an apparatus for an air distribution system of an air outlet device having a first portion thereof for the passage of primary air from the apparatus and means for selectively permitting or inhibiting the entrance of enclosure air into the apparatus through a second portion of the outlet device.

These and other objects and advantages of the invention will appear more fully from the following description, considered together with the accompanying drawing, in which drawing:

Fig. 3 is a section along the line 3—3 of Fig. 1.

Fig. 4 is a section along the line 4—4 of Fig. 1, with the valve linkage mechanism removed.

Fig. 6 is a fragmentary perspective view showing the valve linkage mechanism.

Fig. 7 is a bottom perspective view of the bell crank forming part of the valve linkage mechanism.

Fig. 10 is a fragmentary view of the back face of the jet plate showing the damper bar attached thereto.

Fig. 11 is a side view of the jet plate and damper bar.

Fig. 12 is a section along the line 12—12 of Fig. 11 showing the damper bar in closed position.

Fig. 13 is a section in perspective along the line 13—13 of Fig. 10 showing the damper bar in open position.

Figure 1:
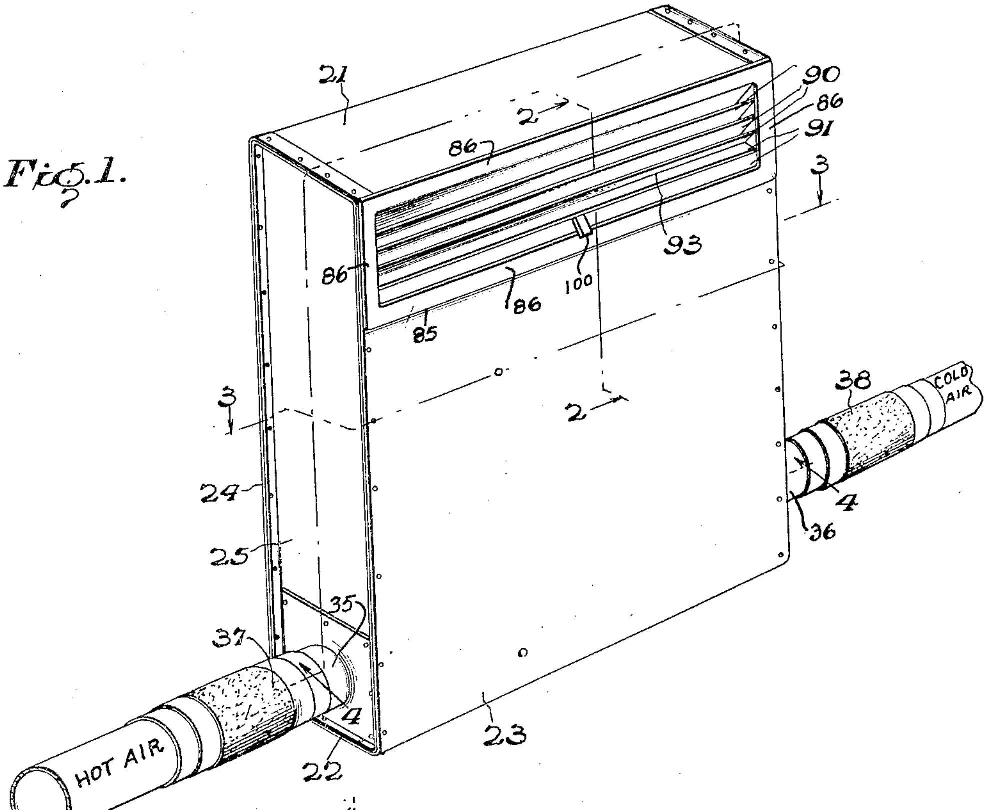
Fig. 1 is a perspective view of an embodiment of the invention.

Referring with more particularity to the drawing in which like numerals designate like parts, the embodiment illustrated in Figs. 1 to 13 comprises, in general, a rectangular housing having a top wall 21, bottom wall 22, side walls 23 and 24, and end walls 25 and 26. The interior of the housing is divided by a transverse partition 27 into two chambers, one chamber 28 comprising the plenum or inlet chamber and the other chamber 29, the attenuation or outlet chamber.

Figure 2:
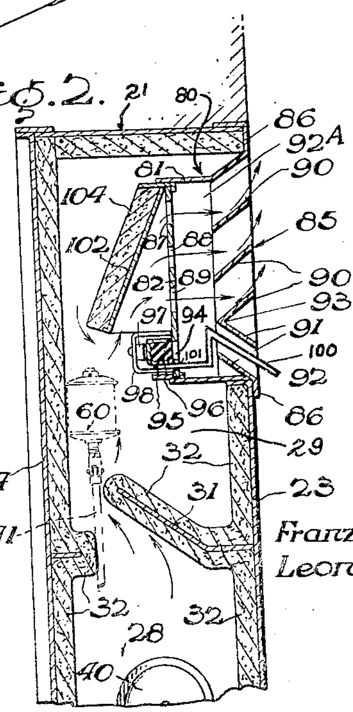
Fig. 2 is a section along the line 2—2 of Fig. 1.
Figure 5:
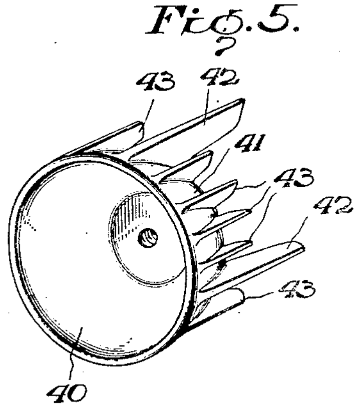
Fig. 5 is a perspective view of one of the valve members.

The partition 27 is provided with an opening 30 forming a passageway for air from the plenum chamber to the attenuation chamber. A baffle plate 31 is disposed in the attenuation chamber in front of the opening 30. It extends across the opening 30 and projects diagonally upward toward the side wall 23, as shown in Fig. 2.

The inner faces of the walls 21, 22, 23, 24, 25, and 26, and the faces of the baffle plate 31 and partition 27 are each provided with sheets of an efficient sound deadening or sound absorbing material 32, such as felted or matted glass fiber, or other suitable material.

Air inlet ports 33 and 34 are provided in the end walls 25 and 26, respectively, for the plenum chamber 28. These ports are fitted with tubular collars 35 and 36 for attaching the air inlet pipes 37 and 38, one being for hot air and the other for cold air, although the device may be provided with only a single inlet port for either hot or cold air.

Each collar carries a valve 39 and 40, respectively. These valves have a conical or hemispherical inner section 41 surmounted by radial fins projecting outwardly into their respective collars 35 and 36. Some of these fins 42 (four shown) are elongated and slide against the inner wall of the collar as it moves between its open and closed positions. The outer edges of the fins are straight and nearly parallel to the longitudinal axis of the valve and collar having a slight backward taper to prevent wedging. The smaller fins 43 are disposed between the elongated fins 42 and all the fins are wedge-shaped, tapering outwardly in the longitudinal direction.

The valves are connected to rods 44 and 45, respectively, which project inside the plenum chamber toward each other. The inner ends of the rods are hollow and fit over the ends of a guide rod 46 to hold them in axial alignment, but permitting relative slidable movement therebetween in the axial direction.

The outer ends of the rods 44 and 45 are also provided with external threads 47 and 48 which are engaged with threaded apertures in block members 49 and 50, respectively. The rods 44 and 45 are slidably supported on arms 51 and 52 of a U-shaped bracket 53 in the plenum chamber.

The two blocks 49 and 50 are adjustable relative to each other by means of an adjusting shaft 54. One end of the shaft 54 is journaled for rotation in one of the blocks, say the block 49, and the other end is provided with threads 55 which are threadedly engaged with another threaded aperture in the other block 50. The shaft 54 is also connected to one end of a torque cable 56. Consequently, by turning the torque cable at the other end, rotation of the shaft 54 may be effected in one direction or the other causing the blocks 49 and 50 to move closer together or farther away and carry with them the rods 44 and 45 in slidable engagement with the center rod 46.

To move the rods 44 and 45, together with their valves, in unison, a pair of links 57 and 58 are provided in conjunction with a bell crank 59 and a diaphragm motor 60. The links 57 and 58 are pivotally connected together at their inner ends by means of a pin 61 or other suitable means. The outer ends of the links are pivotally connected to the block members 49 and 50 by means of pins 62 and 63, respectively.

The bell crank 59 has right angle arms 64 and 65 and a fulcrum aperture 66 in arm 64 which is pivoted to an inwardly offset section 68 of the bracket 53. However, the aperture 66 may be provided at any other place on the bell crank suitable as the fixed pivot point thereof. The arm 65 has a longitudinal slot 69 which slidably engages the pin 61. The other arm 64 is provided with one or more apertures 70 for pivotal connection to the outer end of an adjustable rod 71 attached to the reciprocating piston rod 72 of the motor 60. The motor is supported on a bracket 73 and is held in fixed position relative to the bracket 53 by means of a strap member 74, one end of which is attached to the bracket 73 and the other end being bent to form an offset support 75 for the bracket 53, fitting under the section 68 thereof or at some other suitable place. The support 75 is welded or otherwise secured to the bracket 53.

The entire unit thus supported by the strap member 74 is secured to the wall 24 by bolts, rivets or screws passing through apertures 76 in the member, or by any other suitable means.

From the above description it may be seen that reciprocation of the air motor piston rod 72 will cause a turning of the bell crank 59 one way or the other, depending on the direction of reciprocation, and will force the pin 61 to one side or the other, resulting in the simultaneous movement of the block members 49 and 50 together with the rods 44 and 45 and their corresponding valve members 39 and 40. Movement of the piston rod is controlled by fluid pressure on a spring biased piston or diaphragm (not shown) within the housing of the motor 60, supplied through a pipe line 77 and regulated by the usual thermostatic control valve (not shown).

The setting of the valves 39 and 40 relative to each other determines the fullest extent to which they may be alternately opened and will depend upon the desired maximum capacity of the unit. After being thus set, the valves function as a unit for proportioning the amount of primary air flowing into the plenum chamber. When one valve is in its fully open position under the conditions to which it has been adjusted, the other valve is in its fully closed position, and vice versa. Between these extreme positions, any intermediate position may be achieved by moving the valves simultaneously.

As the high pressure air passes through the valve ports 33 and 34, the streams are broken up into smaller streams by the fins 42 and 43 and pass into the plenum chamber. This results in a reduction of static air pressure and velocity at a low noise level. Because they enter the plenum chamber from opposite directions, the streams strike each other head on and thereby become mixed before passing into the attenuation chamber where the velocity of the air is further reduced or attenuated. The baffle plate 31 is effective in completing a thorough mixture of the two streams of air and also to deflect and deaden sound waves traveling from the plenum chamber toward the attenuation chamber.

The attenuation chamber is provided with an outlet device through which the air is discharged into a zone or enclosure, such as a room, to be air conditioned. This outlet device may be of any suitable type or design, but preferably is one which rapidly and efficiently diffuses the air emerging therethrough with the air of the zone being conditioned and which directs the air in such a manner as to minimize or eliminate harmful drafts. Also, the outlet device may be of the circular, semicircular, square, rectangular or straight line type, the latter being illustrated in Figs. 1, 2, and 8 to 12.

Figure 8:
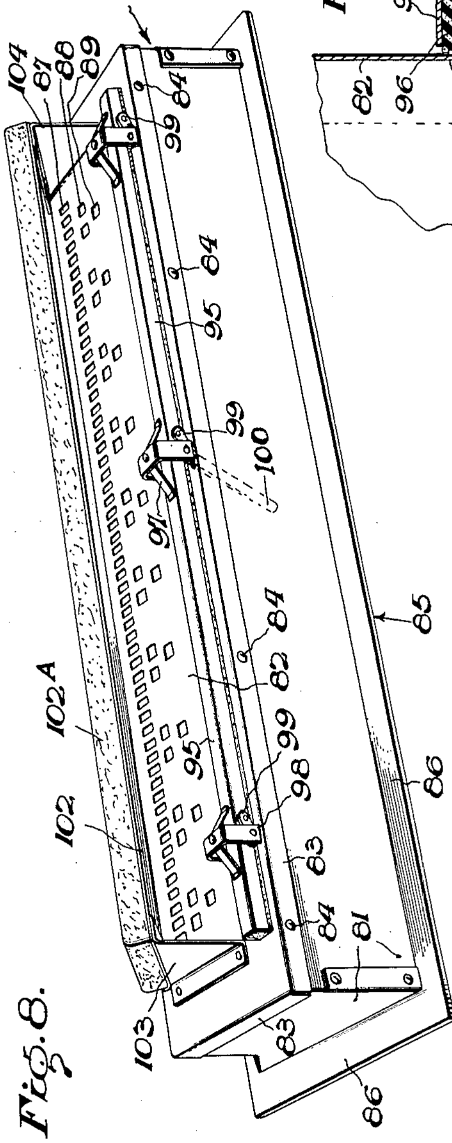
Fig. 8 is a rear perspective view of the combined induction and outlet unit apart from the apparatus as a whole.
Figure 9:
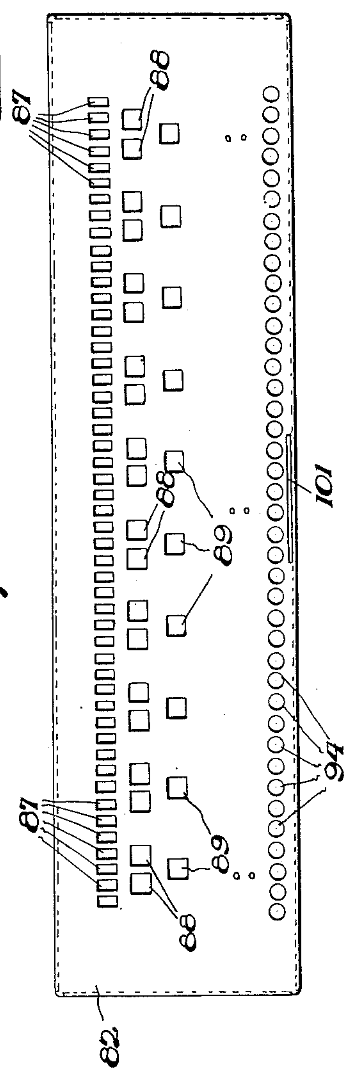
Fig. 9 is a front face view of the jet plate member forming part of the unit of Fig. 8.

The embodiment further comprises an elongated box-like structure 80 having side walls 81. A back wall in the form of a jet plate 82 has flanges 83 for removably securing it with screws 84 to the side walls, substantially as shown in Fig. 8. The front wall 85 is in the form of a removable outlet, hereinafter more fully described, and has frame edges 86 extending beyond the side walls 81.

The member 82 is provided with a number of apertures for the escape of air from the attenuation chamber in the form of induction jets. These apertures are arranged in patterns to provide for maximum induction efficiency. A preferred pattern is illustrated clearly in Fig. 9 and consists of a top row of closely spaced square or rectangular apertures 87. The second row consists of pairs of apertures 88 of somewhat larger size, each pair being spaced from its adjacent pair a distance several times greater than the distance between the apertures 87 of the first row. The third row consists of apertures 89, similar to the apertures 88, but spaced widely apart and in such a way that each aperture 89 is positioned in front of the space between a pair of apertures of the preceding row.

This triangular or echelon pattern of arranging the apertures provides upwardly converging areas into which air is upwardly drawn progressively by the jets and which is mixed with them as they are expelled. In this type of jet plate, the apertures are provided in the upper half of the plate and deflector vanes 90 at the upper part of the outlet 85 are set at an angle to deflect the air therefrom upwardly and outwardly. The lower part of the outlet 85 is provided with vanes 91 set in the opposite direction. The deflector vanes are attached to stanchions 92A. The space between the vanes 91 provides a passageway 92 through which air is drawn from the exterior or enclosure area being treated by the aspirating effect of the air jets discharged through the apertures 87, 88 and 89.

The uppermost of the vanes 91 and the lowermost of the vanes 90 intersect at an apex 93 and together form a V-shaped member which establishes a "dead" space between the two oppositely flowing streams and thereby acts as a divider baffle to separate the air streams passing outwardly between the top vanes and the air passing inwardly between the bottom vanes.

Under certain conditions it is sometimes desired to dispense with the flow of air inwardly through the passageway 92 and to utilize this passageway for delivery of air from the unit into the zone forwardly and/or downwardly, while air is at the same time being delivered from the unit upwardly through the upper vanes. Altenatively, the outlet 85 may be substituted with one in which all the deflector vanes are set at the same angle, or of any other type of outlet desired, including those having a structure designed to cause aspiration without the use of a jet plate.

Apertures 94 are provided along the bottom section of the jet plate opposite the passageway 92 or the bottom section of a substitute outlet. Primary or supply air discharging through these bottom apertures opposes and overcomes the reverse flow of aspirated enclosure air which would otherwise tend to flow through the passageway 92.

In order to permit the use of the unit either way, a damper or cover member in the form of a channel bar 95 is set across the back of the plate with the open face of the channel opposite the apertures 94. The channel is filled with a strip of sponge rubber 96, cork, or other suitable material, which projects slightly beyond it and acts as a gasket or seal between the bar and the apertures 94. Alternately, the bar 95 may be inverted with the open face of the channel directed rearwardly and the seal member 96 secured to the outer face of the channel web. The strip 96 is normally biased against the apertures 94 by means of leaf springs 97 mounted between U-shaped brackets 98 and the back of the damper bar 95, substantially as illustrated. However, other suitable biasing means may be employed, such as coil springs, rubber cushions, etc.

The brackets 98 straddle the damper bar and are secured to the jet plate, such as by welding, or other suitable means. Each bracket is also provided with a pair of links 99, one end of which is pivoted to the bracket and the other end to the bar so as to hold the bar in parallelism relative to the jet plate.

One of the links 99 is provided with an extension arm 100 which projects through a slot 101 in the jet plate. By means of this arm, the bar 95 is urged rearwardly away from the jet plate against the action of the springs 97. When the bar is moved past dead center of the links 99, the bar will remain in the open position until the arm is forced back to its original position.

Figure 14:
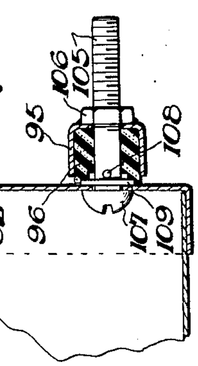
Fig. 14 is a fragmentary section of alternate means for moving the damper bar.

Other means for moving the damper bar to uncover the apertures 94 may be used, the means illustrated and described above being merely suggestive and representative of various mechanical linkages for effecting a translation of the bar to and from the jet plate. For example, the damper bar may be mounted on adjusting screws 105 engaging nuts 106, as shown in Fig. 14. The nuts 106 are brazed or otherwise secured to the back of the damper bar. The heads 107 of the screws are each held in place against the front face of the jet plate by a pin 108 set in and projecting laterally from a transverse hole in the screw at the back of the plate. A washer 109 is placed between the pin and jet plate as shown.

Behind the jet apertures 87, 88 and 89, a deflector baffle 102 is diagonally set relative to the jet plate, on brackets 103 and 104 at the ends thereof. The back face of the baffle plate 103 is also provided with sound deadening material 102A.

Figure 15:
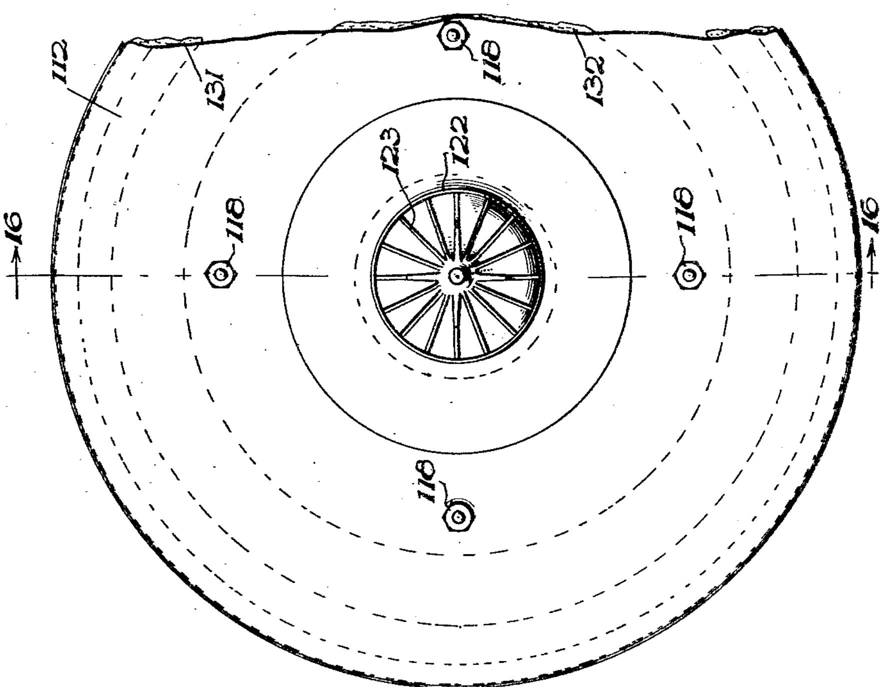
Fig. 15 is a rear plan view of a modified form of the invention, partly broken away.
Figure 16:
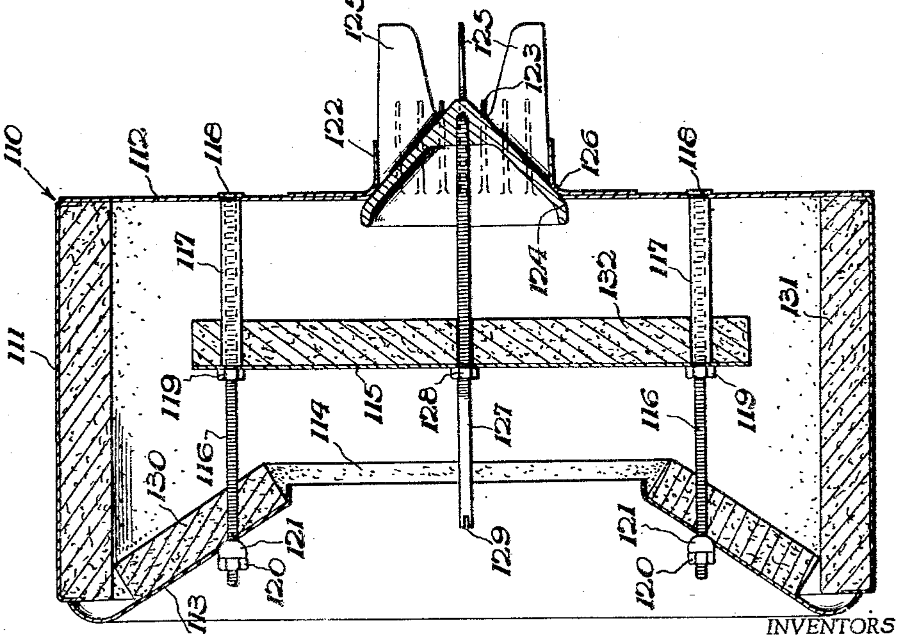
Fig. 16 is a section along the line 16—16 of Fig. 15.

The embodiment illustrated in Figs. 15 and 16 has particular application for installation in ceilings and comprises a casing 110 having a circular side wall 111 and a back wall 112. The front wall 113 comprises the outer member of any desired air outlet or diffuser (not shown) and it extends rearwardly in the form of a hollow truncated member, such as a cone, pyramid, etc.

Intermediate between the central aperture 114 of the front wall 113 and the back wall 112, there is disposed a baffle plate 115 parallel to the back wall and extending beyond the edges of the aperture 114, substantially as shown.

The baffle plate 115 is mounted on arms 116 projecting inwardly from the back wall and passing through the front wall. The baffle 115 is held in spaced relation relative to the front and rear walls by means of spacing sleeves 117 carried by the arms 116. The rear ends of the sleeves abut the back wall and their front ends are abutted by the baffle plate 115.

The rear ends of the arms 116 pass through the back wall and are provided with heads 118 which are held against the wall. The arms 116 are threaded and carry intermediate nuts 119 which are drawn tight against the front face of the baffle plate 115. The forward ends of the arms 116 projecting through the front wall 113, are also provided with nuts 120 and hemispherical bearings or washers 121 between the nuts and the wall.

The back wall 112 is provided with a central air inlet opening or port about which an annular collar 122 is secured for connection to a duct (not shown) carrying the air to be discharged into the area or zone to be heated, cooled, or otherwise conditioned. A valve 123, similar to the ones used in the embodiment described above, is disposed in the opening of the collar and it functions in a similar manner to break up the inflowing airstream into smaller streams and, hence, to reduce static pressure and velocity at a low noise level. The circular portion 124 of the valve in front of the fins 125 seats in its closed position, against the inner annular edge 126 of the collar 122, as in the case of the first embodiment described above.

A rod 127 is axially disposed in the casing and has its rearward end secured to the valve 123. The rod projects forwardly through an opening in the baffle plate 115 and is threadedly engaged with a nut 128, said nut being welded or otherwise secured to the baffle plate to form a boss thereon. The forward end of the rod is provided with a screw-driver slot 129 so that it may be engaged by a screw-driver and rotated to change the axial position of the valve 123. However, a knurled knob (not shown) fixed or removable, or other suitable means, may be used instead of the screw-driver slot to facilitate rotation of the rod for this purpose.

Sound deadening or absorbing material lines the inside of the casing in the path of air traveling therethrough, such as the glass fiber padding 130, 131 and 132 on the back face of the front wall, on the inner sides of the casing wall, and on the back face of the baffle plate, respectively. In this form of the invention, the portion of the housing between the baffle plate and the back wall functions as the plenum chamber and is comparable to the plenum chamber 28 in the embodiment first described above. The portion of the housing between the baffle plate and the front wall functions as the attenuation chamber. The front wall itself is the final outlet member.

Having thus described our invention, we claim:

1. Apparatus for an air distribution system comprising wall members forming a single plenum air mixing chamber, one of said wall members having an outlet opening, said wall members including a pair of oppositely facing walls, an opening in each of said oppositely facing walls presented as inlets for connection, respectively, to hot and cold air ducts, a pair of axial flow air valves, imperforate walls forming a pair of tubular means, each tubular means slidably supporting one of said valves in one of said inlets and for connecting one of the air ducts to the apparatus, a variable length extension member having each of its ends connected to one of said valves, said extension member including means for adjusting the length thereof to change the distance between said valves, a motor having a power take-off member, and a linkage connecting said take-off member to said extension member for reciprocation of the latter relative to said inlets.

2. Apparatus as defined by claim 1 in which the take-off member is of the reciprocating type and is disposed at an angle to the extension member, and the linkage includes a bell crank, a bracket secured to a wall of the plenum chamber, said bell crank being pivoted at its fulcrum to said bracket, one arm of the bell crank being slidably attached to the extension member.

3. Apparatus as defined by claim 1, in which the air valve is substantially conical and comprises a plurality of first radial fins, subdividing the exterior surface of the valve into quadrants, and a plurality of additional radial fins between said first fins, subdividing the spaces between the first fins into a plurality of smaller passages, each pair of consecutive fins having their opposing faces substantially parallel to each other.

4. Apparatus for high velocity air distribution systems comprising wall members forming an enclosure for air, a partition within the enclosure delineating, with portions of the wall members, an air plenum mixing chamber, the remaining portion of the enclosure being of larger volume than the plenum chamber and comprising an air velocity attenuation chamber, a wall of said attenuation chamber having an outlet opening for the discharge of attenuated air, said plenum chamber having a pair of oppositely facing walls, an opening in each of said oppositely facing walls for connection, respectively, to hot and cold air supply ducts, an axial flow air valve for each of said openings, imperforate walls forming a pair of tubular members, each tubular member, being secured to the apparatus adjacent to and aligned with one of said openings for connection to one of said air ducts, said valves being slidably supported by said tubular members, said partition having an opening therein for the passage of air from the plenum chamber to the attenuation chamber, said opening being restricted so as to maintain a substantially higher air pressure in the plenum chamber than in the attenuation chamber when air is flowing into the plenum chamber through said valves, a variable extension member having each of its ends connected to one of said valves, said extension member including means for adjusting the length thereof to change the distance between said valves, a motor having a power take-off member, and a linkage connecting said take-off member to said extension member for reciprocation of the extension member relative to said openings.

5. Apparatus for high velocity air distribution systems comprising wall members forming an enclosure for air, a partition within the enclosure delineating, with portions of the wall members, an air plenum mixing chamber, the remaining portion of the enclosure being of larger volume than the plenum chamber and comprising an air velocity attenuation chamber, a wall of said attenuation chamber having an outlet opening for the discharge of attenuated air, said plenum chamber having a pair of oppositely facing walls, an inlet opening in each of said oppositely facing walls for connection, respectively, to hot and cold air supply ducts, an axial flow air valve for each of said openings, imperforate walls forming a pair of tubular members, each tubular member being secured to the apparatus adjacent to and aligned with one of said openings for connection to one of said air ducts, said valves being slidably supported by said tubular members, said partition having an opening therein for the passage of air from the plenum chamber to the attenuation chamber, said opening being restricted so as to maintain a substantially higher air pressure in the plenum chamber than in the attenuation chamber when air is flowing into the plenum chamber through said valves, a variable extension member having each of its ends connected to one of said valves, said extension member including means for adjusting the length thereof to change the distance between said valves, a motor disposed within the attenuation chamber, said motor having a power take-off member, and a linkage connecting said take-off member to said extension member through said restricted opening for reciprocation of the extension member relative to said openings.

6. Apparatus as defined by claim 5, in which the inlet openings and valves are coaxially aligned through the plenum chamber so as to cause streams of air flowing into the plenum chamber from the ducts to have opposing velocities and to collide with each other within the plenum chamber.

7. Apparatus as defined by claim 5, and an outlet device in said outlet opening.

8. Apparatus as defined by claim 7, in which the outlet device comprises a perforated plate.

9. Apparatus as defined by claim 7, in which the outlet device comprises a perforated plate, and a plurality of vanes in front of said plate for deflecting air passing through the perforations of the plate.

10. Apparatus as defined by claim 9, in which the perforations of the plate are disposed relative to each other in an echelon pattern.

11. Apparatus for an air distributor system comprising wall members forming a plenum chamber, said wall members including a pair of oppositely facing walls, an opening in each of said walls presented as inlets for connection, respectively, to hot and cold air ducts, an air valve slidably disposed in each of said inlets, a pair of rods each having its outer end connected to one of the said valves, the inner ends of the rods extending inwardly toward each other, means for slidably supporting the inner ends of said rods in axial alignment, means for adjusting and for holding in adjusted positions the inner ends of said rods relative to each other, a pair of links each having one end pivotally connected to one of said rods, a pin connecting the other ends of said links to each other, a motor mounted in said chamber having a reciprocating power take-off member movable at an angle to said rods, a bracket secured in said chamber, a bell crank fulcrumed to said bracket, one arm of said bell crank being connected to said take-off member and the other arm having a longitudinal slot slidably engaging said pin.

References Cited in the file of this patent

UNITED STATES PATENTS

| | | |
|---|---|---|
| 1,783,005 | Stewart | Nov. 25, 1930 |
| 2,116,873 | Williams | May 10, 1938 |
| 2,122,168 | Woolley | June 28, 1938 |
| 2,157,025 | Snediker | May 2, 1939 |
| 2,161,284 | Crowell | June 6, 1939 |
| 2,172,944 | Norris | Sept. 12, 1939 |
| 2,262,124 | Truax | Nov. 11, 1941 |
| 2,423,241 | Kurth et al. | July 1, 1947 |
| 2,442,963 | Sewell et al. | June 8, 1948 |

(Other references on following page)

UNITED STATES PATENTS

| | | |
|---|---|---|
| 2,529,592 | Boyle | Nov. 14, 1950 |
| 2,541,280 | Phillips | Feb. 13, 1951 |
| 2,600,934 | Spieth | June 17, 1952 |
| 2,620,983 | Lyman | Dec. 9, 1952 |
| 2,639,655 | Whitehead | May 26, 1953 |
| 2,644,389 | Dauphinee | July 7, 1953 |
| 2,654,528 | Cones | Oct. 6, 1953 |
| 2,687,746 | Argentieri | Aug. 31, 1954 |
| 2,724,320 | Tutt | Nov. 22, 1955 |
| 2,727,454 | Jones | Dec. 20, 1955 |
| 2,750,865 | Tutt | June 19, 1956 |
| 2,793,812 | McDonald | May 28, 1957 |

FOREIGN PATENTS

| | | |
|---|---|---|
| 567,452 | Great Britain | Feb. 14, 1945 |
| 116,719 | Australia | June 30, 1942 |
| 884,634 | France | May 3, 1943 |